United States Patent [19]

Sawasaki et al.

[11] Patent Number: 4,995,283
[45] Date of Patent: Feb. 26, 1991

[54] HYDRAULIC CONTROL SYSTEM FOR STEPLESSLY VARIABLE POWER TRANSMISSION

[75] Inventors: Tomoo Sawasaki; Chitoshi Morishige, both of Hiroshima, Japan

[73] Assignee: Mazda Motor Corporation, Hiroshima, Japan

[21] Appl. No.: 354,519

[22] Filed: May 19, 1989

[30] Foreign Application Priority Data

May 19, 1988 [JP] Japan ................ 63-123273

[51] Int. Cl.$^5$ .................................. B60K 41/18
[52] U.S. Cl. ............................. 74/866; 74/868
[58] Field of Search ................ 74/861, 866, 867

[56] References Cited

U.S. PATENT DOCUMENTS

| | | | |
|---|---|---|---|
| 4,152,947 | 5/1979 | van Deursen et al. | 474/11 |
| 4,665,775 | 5/1987 | Nagamatsu et al. | 74/868 |
| 4,671,138 | 6/1987 | Nobumoto et al. | 74/862 |
| 4,671,140 | 6/1987 | Koshio | 74/868 |
| 4,673,377 | 6/1987 | Akutagawa | 474/1 |
| 4,730,523 | 3/1988 | Takahashi | 74/868 |
| 4,764,156 | 8/1988 | Ohkumo | 74/866 X |
| 4,796,489 | 1/1989 | Nagamatsu et al. | 74/868 |

FOREIGN PATENT DOCUMENTS 60-53257 3/1985 Japan.

*Primary Examiner*—Dirk Wright
*Attorney, Agent, or Firm*—Fleit, Jacobson, Cohn, Price, Holman & Stern

[57] ABSTRACT

A hydraulic control system for a steplessly variable power transmission includes primary and secondary pulleys, a belt connected with both pulleys and, hydraulic chambers for controlling effective diameters of the pulleys for changing a speed ratio steplessly. A speed ratio control valve controls the hydraulic pressure applied to the hydraulic chamber in accordance with a pilot pressure introduced into a pilot chamber provided in the speed ratio control valve means. A solenoid valve controls the pilot pressure applied to the speed ratio control valve, and a fluid pressure producing device produces a control pressure in accordance with a vehicle driving condition. A switch valve selectively connects the pilot chamber with either the solenoid valve or the fluid pressure producing device. The switch valve is actuated so as to connect the pilot chamber with the fluid pressure producing device when a deviation between an actual pilot pressure and a desirable pilot pressure is increased beyond a predetermined value. A stable speed ratio control therefore can be provided.

26 Claims, 12 Drawing Sheets

HYDRAULIC CONTROL SYSTEM FOR STEPLESSLY VARIABLE POWER TRANSMISSION

CROSS-REFERENCE TO RELATED APPLICATIONS

The present application relates to co-pending U.S. patent application Ser. No. 90,514, filed on Aug. 28, 1987, entitled "BELT-PULLEY TYPE STEPLESSLY VARIABLE TRANSMISSION ASSEMBLY" now U.S. Pat. No. 4,817,458, and a U.S. patent application filed on Jan. 29, 1989 entitled "CONTROL SYSTEM FOR STEPLESSLY VARIABLE POWER TRANSMISSION", both of which are assigned to the same assignee as the present application.

BACKGROUND OF THE INVENTION

1. Field of the Invention

The present invention relates to a control system for a steplessly variable power transmission and, more specifically to a hydraulic control system controlling a speed ratio (rotation speed of an input member/rotation speed of an output member) in the transmission under a certain driving condition of a vehicle.

2. Description of the Prior Art

There has been known a steplessly variable power transmission provided with a pulley mechanism as an engine power transmission mechanism having a primary pulley member connected with an engine and a secondary pulley member connected with vehicle wheels of which an effective diameter is changeable by controlling a hydraulic pressure therefor so that a speed ratio therebetween can be controlled. U.S. Pat. Nos. 4,152,947 (corresponding to Japanese Patent Publication No. 63-27592), 4,665,775, 4,671,138, 4,671,140, 4,673,377 and 4,796,489 all disclose controls for belt-pulley type steplessly variable power transmissions.

Japanese Patent Public Disclosure No. 60-53257 discloses a line pressure regulating valve actuated by employing a pilot pressure introduced thereinto for adjusting a line pressure introduced into respective hydraulic chambers for the primary and secondary pulleys and a speed ratio control valve of a pilot pressure action type for controlling an introduction of the line pressure into the hydraulic chamber for the primary pulley wherein the pilot pressures of the line pressure regulating valve and the speed ratio control valve are controlled by a solenoid valve providing a duty control.

With such a duty control, the following problems can occur. The viscosity of converter oil or hydraulic fluid increases as the temperature thereof is decreased. If the duty ratio of the solenoid valve providing pilot pressure at a low temperature of the hydraulic fluid is maintained at the same value as that at a normal temperature, the quantity of fluid drained by the solenoid valve is reduced because of the high viscosity of the hydraulic fluid. Therefore, the pilot pressure is unduly increased beyond a desirable value. This causes an unstable control of the pilot pressure; and thus an unstable speed ratio control.

In addition, a problem may occur in a control circuit for the solenoid valve. When shortcircuiting occurs in the control circuit, the solenoid valve is kept Off so that the pilot pressure is fixed at the maximum value. As a result, an effective control of the speed ratio cannot be accomplished.

SUMMARY OF THE INVENTION

It is therefore an object of the present invention to provide a control system for a steplessly variable power transmission which can always provide a stable control for a pilot pressure introduced into a speed ratio control valve.

It is another object of the present invention to provide a control system for a steplessly variable power transmission which can provide an appropriate speed ratio control.

The above and other objects of the present invention can be accomplished by a hydraulic control system for a steplessly variable power transmission comprising primary and secondary pulleys provided with a stationary conical plate mounted on a shaft and a movable conical plate mounted so as to be axially movable on the shaft. A belt is connected with both the primary and secondary pulleys for transmitting engine power therethrough. A hydraulic chamber into which a hydraulic pressure is introduced for controlling the axial movement of the movable conical plate is provided so that effective diameters of the primary and secondary pulleys are changed for controlling a speed ratio transmitted through the transmission. A speed ratio control valve is provided for controlling the hydraulic pressure applied to the hydraulic chamber in accordance with a pilot pressure introduced into a pilot chamber provided in the speed ratio control valve. A solenoid valve controls the pilot pressure for the speed ratio control valve, and a control pressure is produced by a fluid pressure producing device in accordance with a vehicle driving condition. A switching mechanism selectively connects the pilot chamber means with either the solenoid valve or the device producing the fluid pressure. The switch is actuated to connect the pilot chamber with the fluid pressure producing device when a deviation between an actual pilot pressure and a desirable pilot pressure is increased beyond a predetermined value.

In a preferred embodiment, the switching mechanism is constituted by a switch valve for selectively connecting the pilot chamber of the speed ratio control valve with either the solenoid valve or the fluid pressure producing device. The switch valve is adapted to connect the pilot chamber with the fluid pressure producing device when the solenoid valve is burnt out, short circuited or otherwise out of order and kept Off. The switch valve also connects the pilot chamber with the fluid pressure producing device when a sensor for detecting the vehicle driving condition provides a signal for controlling the solenoid valve means.

Further, the switch valve connects the pilot chamber with the fluid pressure producing device when the viscosity of the hydraulic fluid is higher than a predetermined value.

Preferably, the fluid pressure producing device is adapted to produce a control, such as a pitot pressure, corresponding to an engine rotation speed and/or engine load and/or a vehicle speed.

According to the present invention, under a normal duty control condition, in which a desirable speed ratio control can be stably maintained, the pilot pressure for the speed ratio control valve is controlled by the solenoid valve. Under a control condition other than the normal control condition, the pilot pressure of the speed ratio control valve is controlled by the control pressure produced by the fluid pressure producing device.

Consequently, the speed ratio control in accordance with the present invention stably provides a desirable value of the speed ratio of the steplessly variable transmission regardless of the viscosity of the hydraulic fluid employed in the speed ratio control and the condition of the solenoid valve.

The above and other features of the present invention will be apparent from the following description when considered together with the accompanying drawings.

DESCRIPTION OF THE PREFERRED EMBODIMENTS

Figure 1:
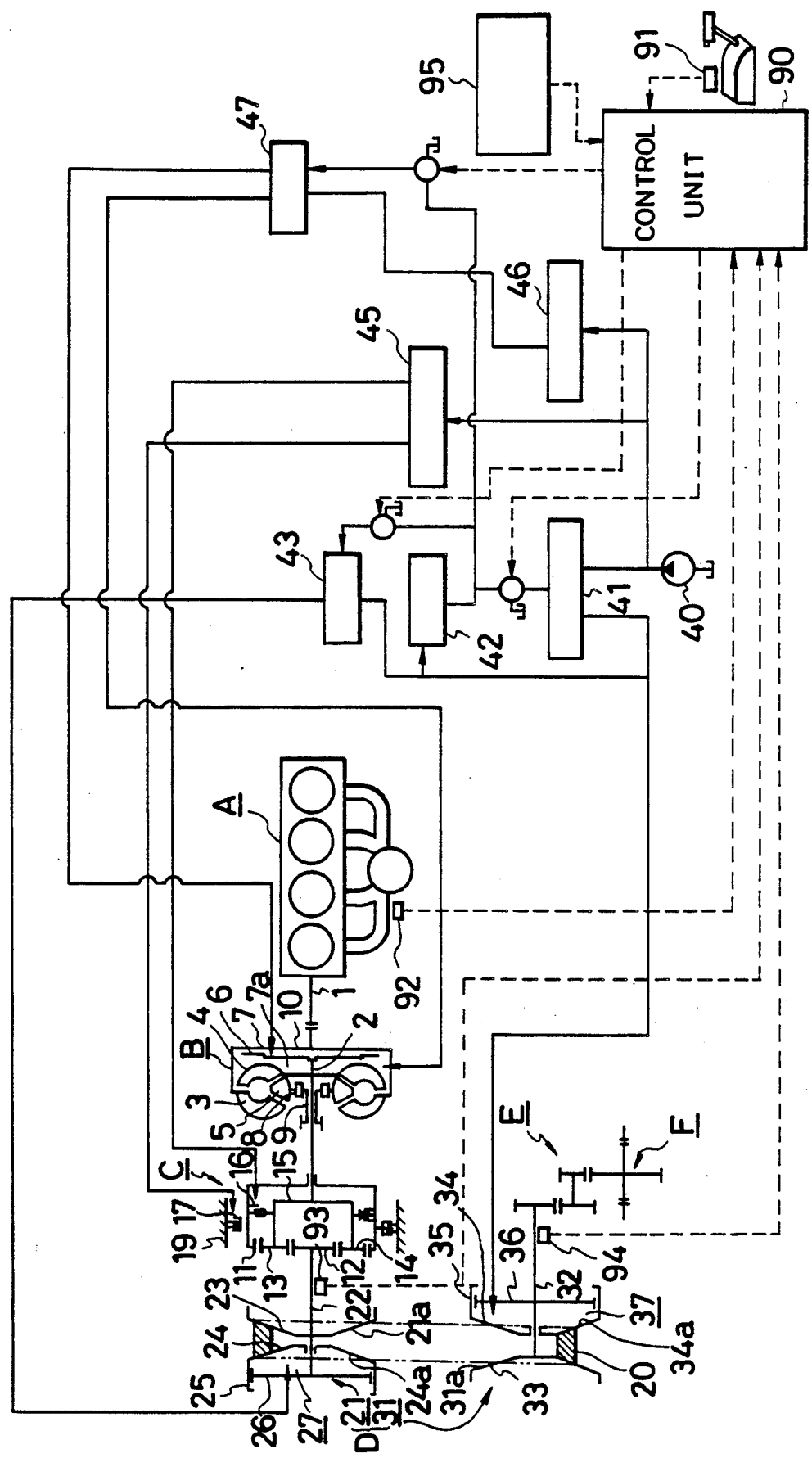
FIG. 1 is a schematic view of a control system for a steplessly variable power transmission in accordance with the present invention.

Referring to the drawings and, specifically to FIG. 1, a steplessly variable power transmission Z in accordance with the present invention is provided with a torque converter B connected with an engine A through an engine output shaft 1, a switching mechanism C for switching a drive mechanism of a vehicle between a forward movement and a reverse movement, a belt-pulley mechanism D, a speed reduction mechanism E and a differential gear mechanism E.

The torque converter B is provided with a pump 3 arranged within a case 7 connected with the output shaft 1. The pump 3 is adapted to rotate together with the output shaft 1. A turbine 4 is arranged within a converter chamber 7a of the case 7 facing the pump 3 and driven by power transmitted from the pump 3 through a hydraulic fluid filled in the case 7. A stator 5 is disposed between the pump 3 and turbine 4 for amplifying a torque transmitted by the torque converter B. The turbine 4 is connected with a carrier 15 or input member of the switching mechanism C through a turbine shaft 2. The stator 5 is connected with a transmission case 19 through an one-way clutch 8 and a stator shaft 9. There is disposed a lock-up clutch 6 connected with the turbine shaft 2 and adapted to be engaged with the case 7 for rotating therewith integrally in a lock-up condition and disengaged from the case 7 in a converter condition. The lock-up clutch 6 is adapted to be engaged when the hydraulic pressure is displaced from a lock-up chamber 10. In the lock-up condition, the engine output shaft 1 is directly engaged with the turbine shaft 2 without any intervention of a hydraulic fluid. When the torque converter B is in the converter condition, the engine torque is transmitted from the engine output shaft 1 to the turbine shaft 2 through the hydraulic fluid.

The switching mechanism C, constituted by a double pinion planetary gear unit in this embodiment, is provided for transmitting the engine torque to the belt-pulley mechanism D to cause either a forward movement of a vehicle or a reverse movement thereof. The illustrated switching mechanism C is provided with first pinion gear 13 meshed with a sun gear 12 and second pinion gear 14 meshed with a ring gear 11. The pinion gears 13 and 14 are mounted on the carrier 15 which is brought into a spline engagement with the turbine shaft 2. The sun gear 12 is brought into a spline engagement with a primary shaft of the belt-pulley mechanism D.

There is disposed a clutch 16 between the ring gear 11 and the carrier 15 for controlling engagement thereof. A brake 17 is disposed between the ring gear 11 and the transmission case 19 for controlling engagement thereof.

Thus, when the clutch 16 is engaged and the brake 17 is disengaged, the ring gear 11 is engaged with the carrier 15 to rotate together with the carrier, and the ring gear 11 can rotate relative to the transmission case 19 so that the rotation of the turbine shaft 2 is transmitted to the primary shaft 22 for rotation through the sun gear 12 in the same direction as the turbine shaft 12 to produce a forward condition of the vehicle. To the contrary, when the clutch 16 is released and the brake 17 is engaged, the ring gear 11 is fixed to the transmission case 19 and can rotate relative to the carrier 15. As a result, the rotation of the turbine shaft 2 is transmitted to the sun gear through the first and second pinion gears 13 and 14 in the reverse direction to produce a reverse movement of the vehicle.

The belt-pulley mechanism D is provided with a primary pulley 21 disposed on the primary shaft 22 and a secondary pulley 31 disposed on a secondary shaft 32 extending in parallel with the primary shaft 22. A belt 20 is engaged with both the primary pulley 21 and the secondary pulley 31.

The primary pulley 21 is provided with a stationary conical member 23 mounted on the primary shaft 22 and a movable conical member 24 axially slidably mounted on the shaft 22. The conical surfaces of pulley 21 face each other in a manner which forms a V shaped groove 21a in section for receiving the belt 20. A cylinder 25 is mounted on one side portion 24a of the movable conical member 24. A piston 26 is movably disposed within the cylinder 25 in an oil tight relationship with the cylinder 25 for defining a primary chamber 27 into which a hydraulic pressure is introduced through a hydraulic circuit Q.

A distance between the movable conical member 24 and the stationary member 23 is controlled in accordance with the hydraulic pressure introduced into the primary chamber 27 so that an effective pitch diameter of the belt 20 can be controlled at a desirable value. Likewise, the secondary pulley 31 is provided with a stationary conical member 33 and a movable conical member 34 on the secondary shaft 32. The secondary pulley 31 is also provided with a cylinder 35 and a piston 36 for defining a secondary chamber 37. The movable conical member 34 can move on the secondary shaft 32 so that an effective pitch diameter of the belt 20 is changed on the shaft 32. Preferably, a pressure area of the movable conical member 34 of the secondary pulley 31 is smaller than that of the primary pulley 21.

The speed reduction mechanism E and the differential mechanism can be any conventional mechanism which is publicly used. A detailed description of the speed reduction and differential mechanisms is omitted because it is not essential to the features of the invention.

When hydraulic pressure supplied to the cylinder 25 for the primary pulley 21 is increased by controlling the hydraulic pressure introduced into the primary chamber 27, the effective pitch diameter of the primary pulley 21 is increased, a speed ratio (rotation speed of the secondary shaft/ rotation speed of the primary shaft) is increased to provide a higher shift stage.

The rotation of the secondary shaft 32 is finally transmitted to the wheels of the vehicle through the speed reduction mechanism E, the differential mechanism F and axles.

Figure 2:
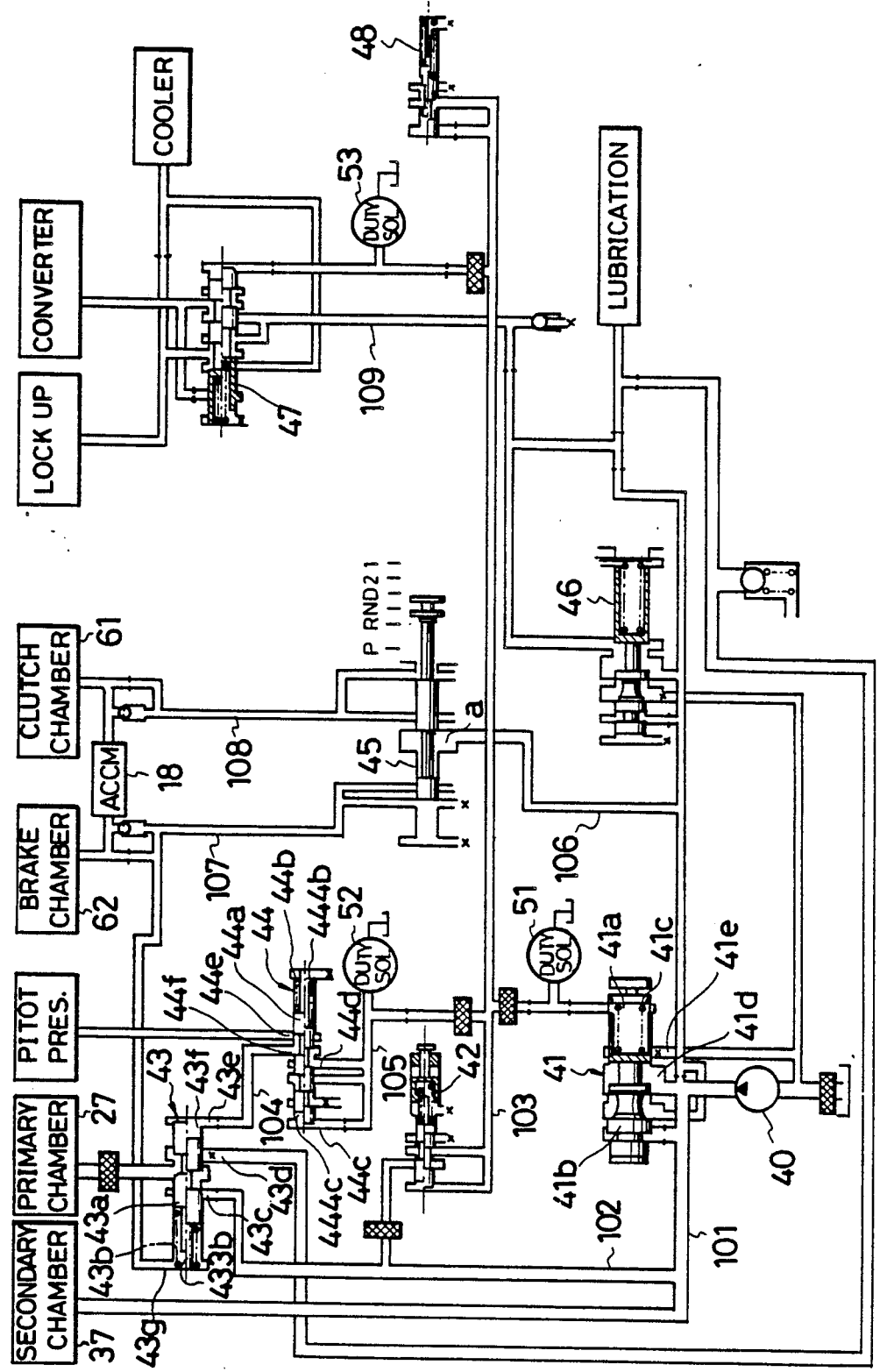
FIG. 2 is a view showing a hydraulic control mechanism.

Referring to FIG. 2, hereinafter, there is described the hydraulic control circuit Q for controlling operations of the lock-up clutch 6, the clutch 16 and the brake 17 of the switching mechanism C and the belt-pulley mechanism D or the primary pulley 21 and the secondary pulley 31.

The hydraulic control circuit Q is provided with an oil pump 40 driven by the engine A. The pressure of hydraulic fluid discharged from the pump 40 is adjusted by a line pressure regulator valve or a secondary pressure valve 41 at a predetermined value of a line pressure, and thereafter introduced into the secondary chamber 37 for the secondary pulley 31 through a line 101 and into the primary chamber 27 of the primary pulley 21 through a line 102 separated from the line 101 The pressure regulator valve 41 is formed with a pilot chamber 41a into which a pilot hydraulic pressure is introduced so as to control the line pressure. For this purpose, the regulator valve 41 is provided with a spool 41b, a spring 41c for biasing the spool 41b in one direction, and formed at a middle portion thereof with a pressure adjusting port 41d into which the hydraulic pressure from the pump 40 is introduced, and with a drain port 41e adjacent to the pressure adjusting port 41d. Into the pilot chamber 41a is introduced a hydraulic pressure as the pilot hydraulic pressure which is reduced and adjusted at a predetermined value by a reducing valve 42 disposed in a line 103 which is separated from the line 102. With this structure, the spool 41b is moved in accordance with a difference between a pressure acting on one end of the spool 41 through the line 101 and a sum of the pilot pressure introduced into the pilot chamber 41a and acting on the other end of the speed 41b a pressure through the line 103 and a resilient force of the spring 41c so that a communication of the drain port 41e with the pressure adjusting port 41d can be controlled to define the line pressure. The pilot pressure can be adjusted by controlling a duty ratio for a first solenoid valve 51 provided on the line 103.

There is provided a speed ratio control valve 43 on the line 102 which is controlled by the pilot pressure. The speed ratio control valve 43 is provided with a spool 43a normally urged in one direction by a spring 43b disposed in a hydraulic chamber 433b formed at one side of the spool 43a, a line pressure port 43c communicated with the line 102, a drain port 43d, a pilot port 43e connected with a pilot chamber 43f formed at the other side of the spool 43a, and a reverse port 43g connected with the chamber 433b. When a line pressure is introduced into the reverse port 43g through a shift valve 45 provided on a line 107, the spool 43a is urged against an end of the pilot chamber 43f as shown by an upper position in FIG. 2 for restricting a movement thereof so that the line pressure port 43c is communicated with the drain port 43d. As a result, the speed ratio is fixed at the maximum value (for reverse movement of the vehicle). On the other hand, when the hydraulic pressure in the chamber 433b is released through the shift valve 45, the spool 43a can be slidably moved by virtue of the pilot pressure introduced into the pilot chamber 43f. The movement of the spool 43a selectively connects the primary chamber 27 with either the line pressure port 43c or the drain port 43d. As a result, the speed ratio control can be accomplished (for forward movement of the vehicle).

In the illustrated embodiment, there are a pair of pilot pressure supply mechanisms, one of which is selected by a switch valve 44 to actually supply the pilot pressure for the speed ratio control valve 43. The switch valve 44 is provided with spool 44a and a spring 44b disposed in one hydraulic chamber 444b for urging the spool 44a in one direction, and a pilot port 44c connected with the other hydraulic chamber 444c opposite to the one hydraulic chamber 444b. The pilot port 44c on the other hand is connected with a line 105 separated from the line 103 so that a pilot pressure is introduced into the pilot chamber 44c through a reducing valve 42 which reduces a hydraulic pressure. The switch valve 44 is further provided at an intermediate portion with a first pilot pressure introducing port 44d communicated with the line 105, a second pilot pressure introducing port 44e into which a pitot pressure is introduced, and a pilot pressure supply port 44f connected with the pilot port 43e of the speed ratio control valve 43 through a line 104. There is provided a second solenoid valve 52 on the line 105 for selectively introducing either a hydraulic pressure adjusted by the second solenoid valve 52 or the pitot pressure corresponding to a factor relating to a vehicle driving condition such as an engine speed into the pilot chamber 43f of the speed ratio control valve 43 as a pilot pressure for controlling the speed ratio.

A hydraulic pressure adjusted by the pressure regulator valve 41 is introduced into the port a of the shift valve 45 through a line 106. The hydraulic pressure is introduced into a brake chamber 62 of the brake 17 through a line 107 when a reverse shift range R is selected. On the other hand, the hydraulic pressure is introduced into a clutch chamber 61 of the clutch 16 through a line 108 when a forward shift range is selected. In the illustrated embodiment, there is an accumulator 18 between the lines 107 and 108 for absorbing a shock caused by operations of engaging and disengaging the clutch 16 and brake 17.

The hydraulic pressure adjusted by the pressure regulator valve 41 is introduced into a clutch pressure control valve 46 in which the hydraulic pressure is further adjusted, thereafter introduced into a lock-up control valve 47 through a line 109. A pilot pressure for the lock-up control valve 47 is controlled by a third solenoid valve 53 so that the hydraulic pressure is selectively introduced into the chamber 10 for disengaging the clutch 6(CONVERTER) and the chamber 7a for engaging the clutch 6 (LOCK-UP). There is further provided a relief valve 48 for relieving the line pressure.

There is provided a control unit 90 for controlling the first through third solenoid valves to thereby control the transmission Z.

Figure 3:
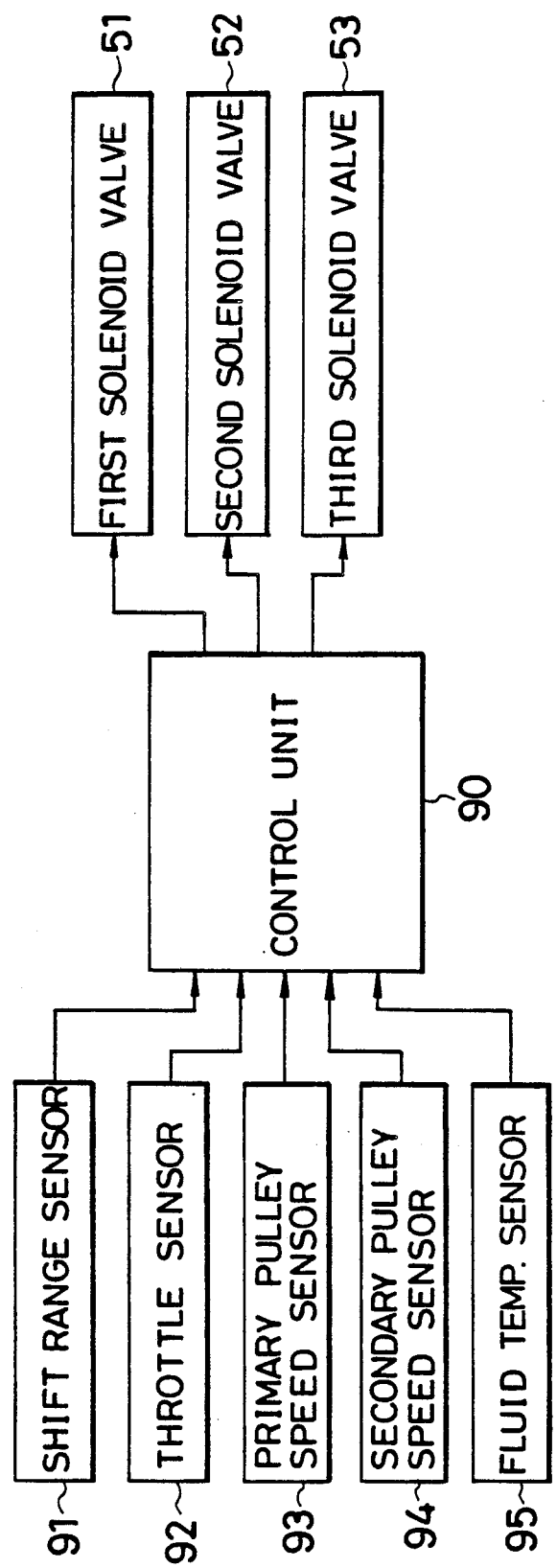
FIG. 3 is a block chart showing a control unit in accordance with a preferred embodiment of the present invention.

As shown in FIG. 3, the control unit 90 receives signals from a shift range sensor 91 for detecting a shift range selected, a throttle sensor 92 for detecting an opening of a throttle, a primary pulley speed sensor 93 for detecting a rotation speed of the primary pulley 21, a secondary pulley speed sensor 94 for detecting a rotation speed of the secondary pulley 31 and, a hydraulic fluid temperature sensor 95 for detecting a hydraulic fluid circulated in the circuit Q.

The control unit 90 receives signals from the above sensors and carries out duty controls for the first through third duty solenoid valves 51, 52, and 53 to control the pressure regulator valve 41, the speed ratio control valve 43, the switch valve 44 and the lock-up clutch control valve 47.

Hereinafter, there is described a control of the speed ratio control valve 43 taking reference with FIG. 4 through FIG. 7.

The control is carried out in accordance with a control program prepared in the control unit 90.

Figure 6:
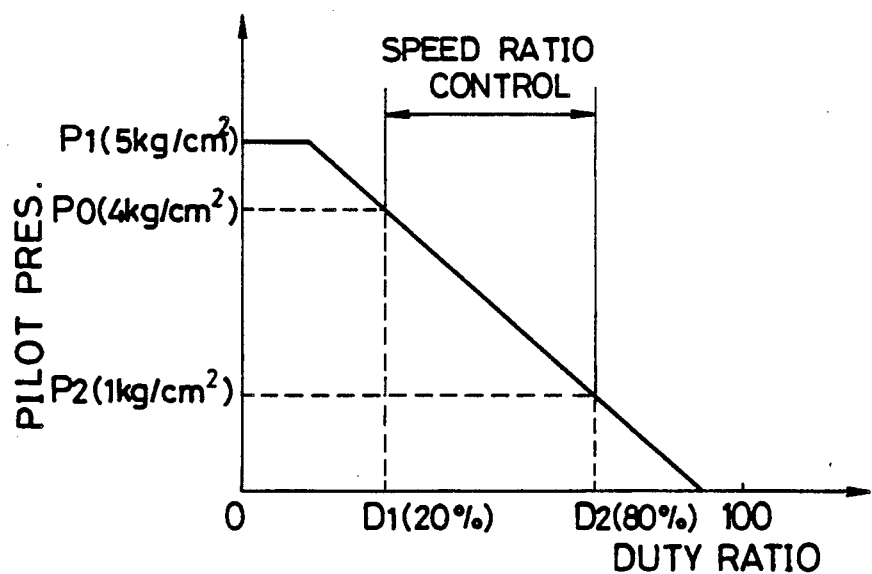
FIG. 6 is a graphical representation showing a relationship between the duty ratio of the solenoid valve and a pilot pressure of the speed ratio control valve.

As shown in FIG. 6, a value of the duty ratio applied to the second solenoid valve 52 can change from 0-100% so that the pilot pressure for the switch valve 44 or a hydraulic pressure in the line 105 changes from 0 -P1(5 kg/cm2) in correspondence with the value of the duty ratio. The spool 44a of the switch valve 44 is positioned so as to connect the first pilot pressure introducing port 44d with the pilot pressure supply port 44f. The second pilot pressure introducing port 44e is shut off when the duty ratio ranges from a value of D1(20%)-D2(80%) which corresponds to the pilot pressure of P0(4 kg/cm2)-P2(1 kg/cm2). The spool 44a moves in the right direction so a to abut with the end of the chamber 444b when the duty ratio ranges from a value of 0-D1 which corresponds to the pilot pressure of P0-P1 so that the first pilot pressure introducing port 44d is shut off and the second pilot pressure introducing port 44e is communicated with the pilot pressure supply port 44f as shown by an upper portion of the drawing of value 44.

Figure 5:
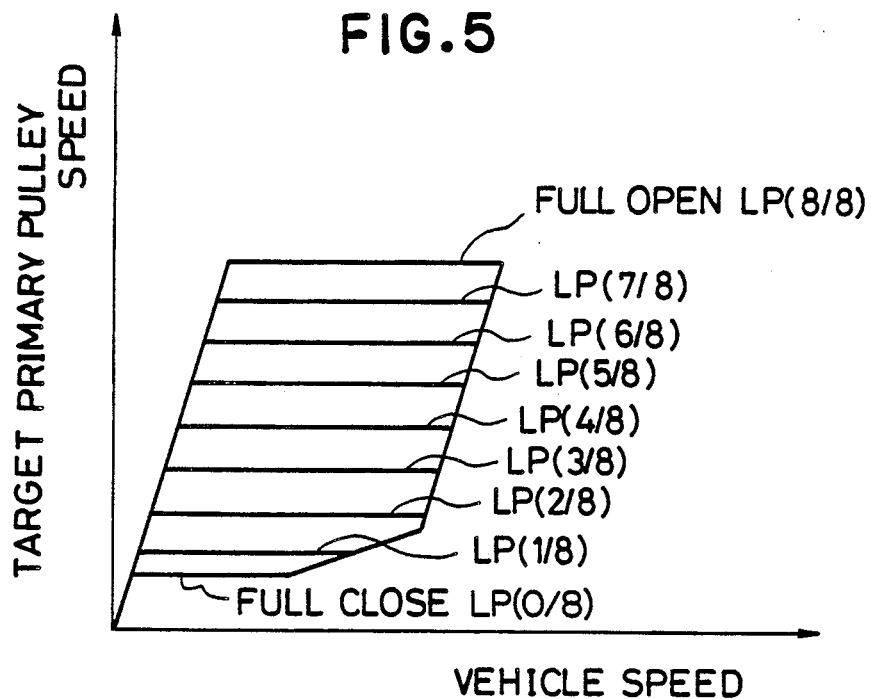
FIG. 5 is a graphical representation showing a target primary pulley speed and vehicle speed.

The control unit 90 gets a target primary pulley speed from a map as shown in FIG. 5 providing the target primary pulley speed in relation to the vehicle speed and the throttle opening. In FIG. 5, lines Lp(0/8), Lp(⅛) through Lp(8/8) denote throttle openings which provide engine output values for no load and ⅛ through 8/8 of the engine load. The lines Lp(⅛) through Lp(8/8) are substantially straight and parallel with one another.

The control unit 90 reads an actual rotation speed of the primary pulley 21 based on the primary pulley speed sensor 93. Then the control unit 90 calculates a difference between the target primary pulley speed and the actual primary pulley speed to get a desirable speed ratio. The controls unit 90 control the second solenoid valve 52 to thereby control the pilot pressure for the speed ratio control valve 43. Thus, the hydraulic pressure introduced into the primary chamber 27 can be controlled to accomplish the target speed ratio.

In this control, in a case where the above speed ratio control tends to be unstable, such as when the temperature of the hydraulic fluid is low, when the second solenoid valve 52 is out of order, when something is wrong with the sensors and the like, the control unit 90 causes the second solenoid valve 52 to turn off and introduce a pitot pressure into the speed ratio control valve 43 as a pilot pressure.

Figure 4:
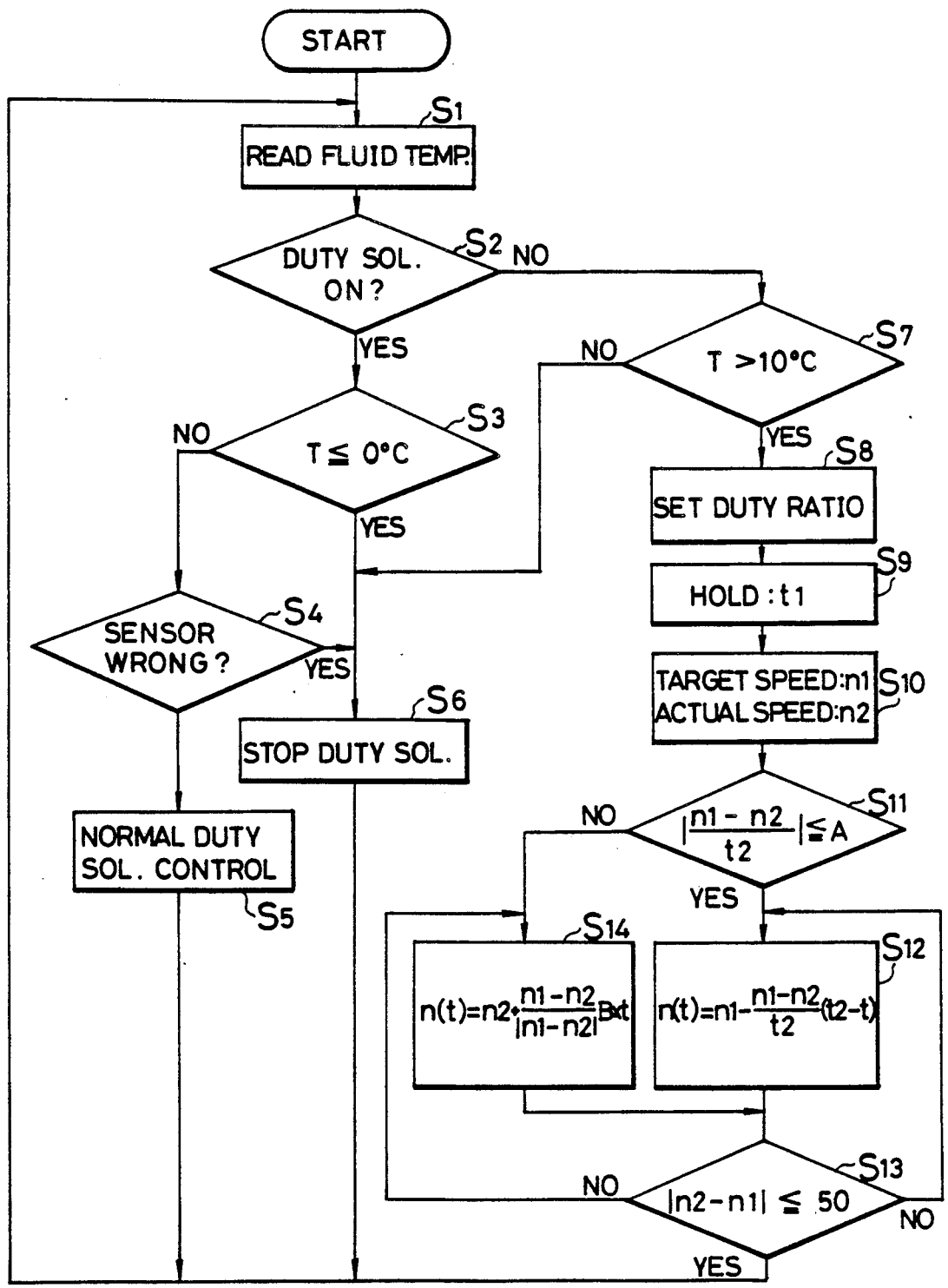
FIG. 4 is a flow chart of a control for controlling the speed ratio.
Figure 7:
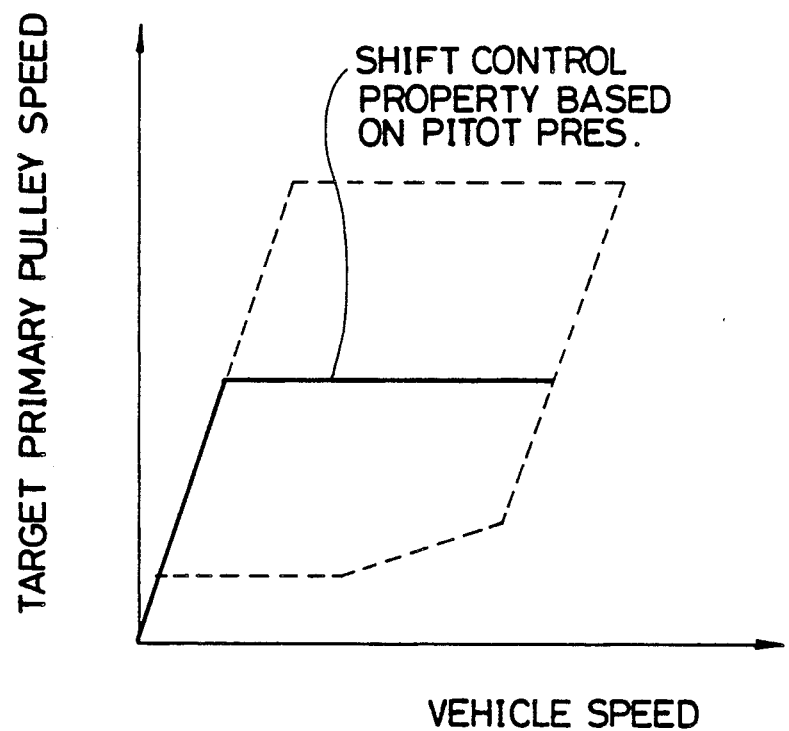
FIG. 7 is a graphical representation of a target primary pulley speed and vehicle speed when utilizing a pitot pressure as a pilot pressure of the speed ratio control valve.

Hereinafter, there is described a control in accordance with a flow chart of FIG. 4. In FIG. 4, the control unit 90 reads the hydraulic fluid temperature (T) (S1) and judges as to whether or not the second solenoid valve 52 is On (S2). Under a normal driving condition of the vehicle, the second solenoid valve 52 is kept On so that the control unit then 90 judges in step (S3) whether or not the temperature T is less than or equal to i.e., not higher than 0 Centigrade degrees (in this embodiment, the temperature of 0 degrees Centigrade is a critical temperature). If this judgment is No, and the temperature T>0, the control unit 90 further judges whether or not the sensors 91–95 are operating properly (S4). If this judgment is Yes, the control unit 90 carries out the duty ratio control of the second solenoid valve 52 to thereby control the pilot pressure for the speed ratio control valve 5 wherein the duty ratio is ranged from D1-100%. On the other hand, if the judgment in step S3 is Yes or the temperature is not higher than 0 Centigrade degrees, the control unit 90 turns off the solenoid valve 52. Likewise, if the judgment in step 4 is Yes or at least one of the sensors is out of order, the control unit 90 turns off the solenoid valve 52. This means the control unit 90 stops a power supply for the solenoid valve 52. Alternatively, the control unit 90 may set the duty ratio at a value 0-D1 to shut off the communication of the pilot port 43e and the first pilot pressure introducing port 44d. As a result, the pitot pressure is introduced into the pilot chamber 43f through the second pilot pressure introducing port 44e (S6). This means that the control for the speed ratio control valve 43 is changed from the control utilizing the second solenoid valve 52 to a control utilizing a pressure producing device. In this embodiment, the pitot pressure is utilized for the control as a fluid pressure. A shift control property in the case of a control utilizing the pitot pressure is provided for example from a map as shown in FIG. 7. The control property is changeable. An abnormal condition of the secondary pulley speed sensor 94 can be detected by a comparison with a speed meter of the vehicle. An abnormal condition of the primary pulley speed sensor can be detected by comparing the primary pulley speed with the engine speed. When the sensor 93 indicates a voltage beyond a predetermined range, it is found that the sensor 93 is out of order.

In the case where the second solenoid valve 52 is kept Off, when the temperature T is increased beyond a predetermined critical value (in this embodiment, 10 Centigrade degrees), the control unit 90 sets the duty ratio for the second solenoid valve 52 at a predetermined value for resuming the speed ratio control utilizing the second solenoid valve 52. In resuming the duty control by the second solenoid valve 52, the control unit 90 changes the duty ratio gradually from a value which provided the same pilot pressure as the pitot pressure so that the speed ratio control can be smoothly transferred from the control based on the pitot pressure to the control utilizing the second solenoid valve 52. For this purpose, the control unit 90 sets the duty ratio at a value which provides the same pilot pressure as that under the control utilizing the pitot pressure(S8) and maintains the value for a predetermined time period t1.

Then, the control unit 90 gets a target primary pulley speed n1 from the map as shown in FIG. 5 and an actual rotation speed n2 thereof based on the sensor 94 (S10). The control unit 90 controls the duty ratio of the second solenoid valve 52 so as to eliminate the difference (n1−n2) between the target and actual speeds n1, n2 within a time period t2. In this control, the control unit 90 judges whether or not an absolute value of (n1−n2)/t2 is not greater than a predetermined value A (S11). When the judgment is Yes, the control unit 90 sets a target speed n(t) of the primary pulley 21 after a time t at a value of n1−{(n1−n2)/t2)}(t2-t) (S12). The control unit 90 controls the solenoid valve 52 until an absolute valve of the difference, or abs(n1-n2) which is not greater than 50 is obtained (S13). Then, the control unit 90 resumes the normal control of the speed ratio by utilizing the solenoid valve 52.

On the other hand, if the judgment in step 11 is No or the absolute value of (n1−n2)/t2 is greater than the predetermined value A, the control unit 90 sets a target speed n(t) of the primary pulley 21 after a time t at a value of n2+{(n1−n2)/abs(n1−n2)}B×t wherein B is a predetermined value relating to a rotation speed change rate which is smaller than the absolute value of (n1−n2)/t2 so that a shock of the vehicle caused by a change in control is alleviated (S14)

Figure 8:
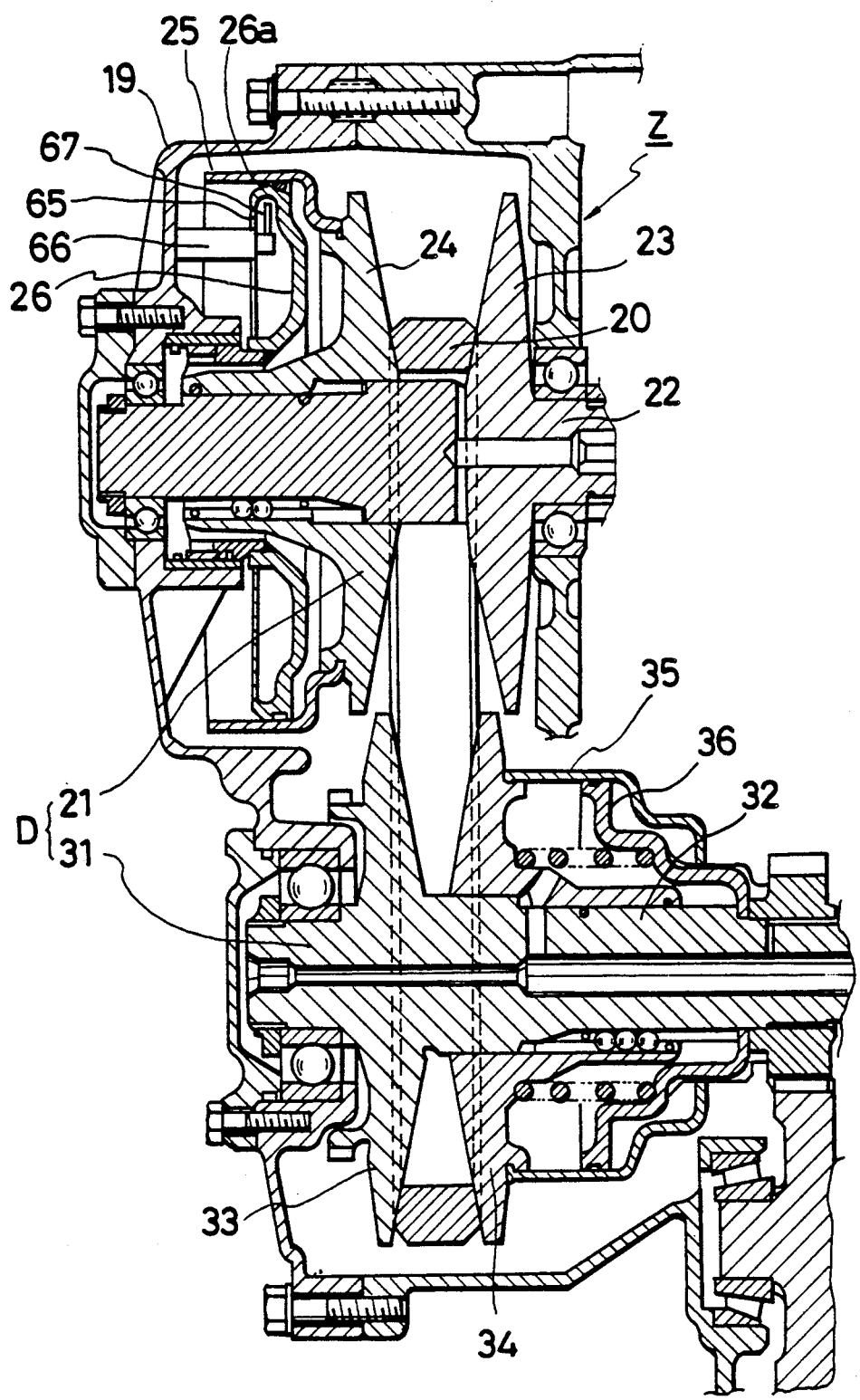
FIG. 8 is a sectional view of a belt-pulley mechanism employed in the present invention.

Hereinafter, a pitot pressure producing mechanism is described taking reference with FIG. 8.

A hydraulic fluid receiving member 65 is mounted on a peripheral portion 26a of the piston 26 to define a fluid receiving section of a U-shaped configuration in section toward an axis of the primary shaft 22. A pitot pressure taking member 66 is mounted on the case 19 for taking the pitot pressure in the fluid receiving section out and for introducing it into the second pilot pressure introducing port 44e of the switch valve 44. A pitot tube 67 for detecting the pitot pressure is mounted on the pitot pressure taking member 66 to be dipped in the hydraulic fluid in the fluid receiving section. As the rotation speed of the primary pulley 21 or engine speed is increased, the hydraulic pressure in the fluid receiving section is increased because of a centrifugal force acting thereon so that a pitot pressure corresponding to the engine speed can be obtained.

Figure 9:
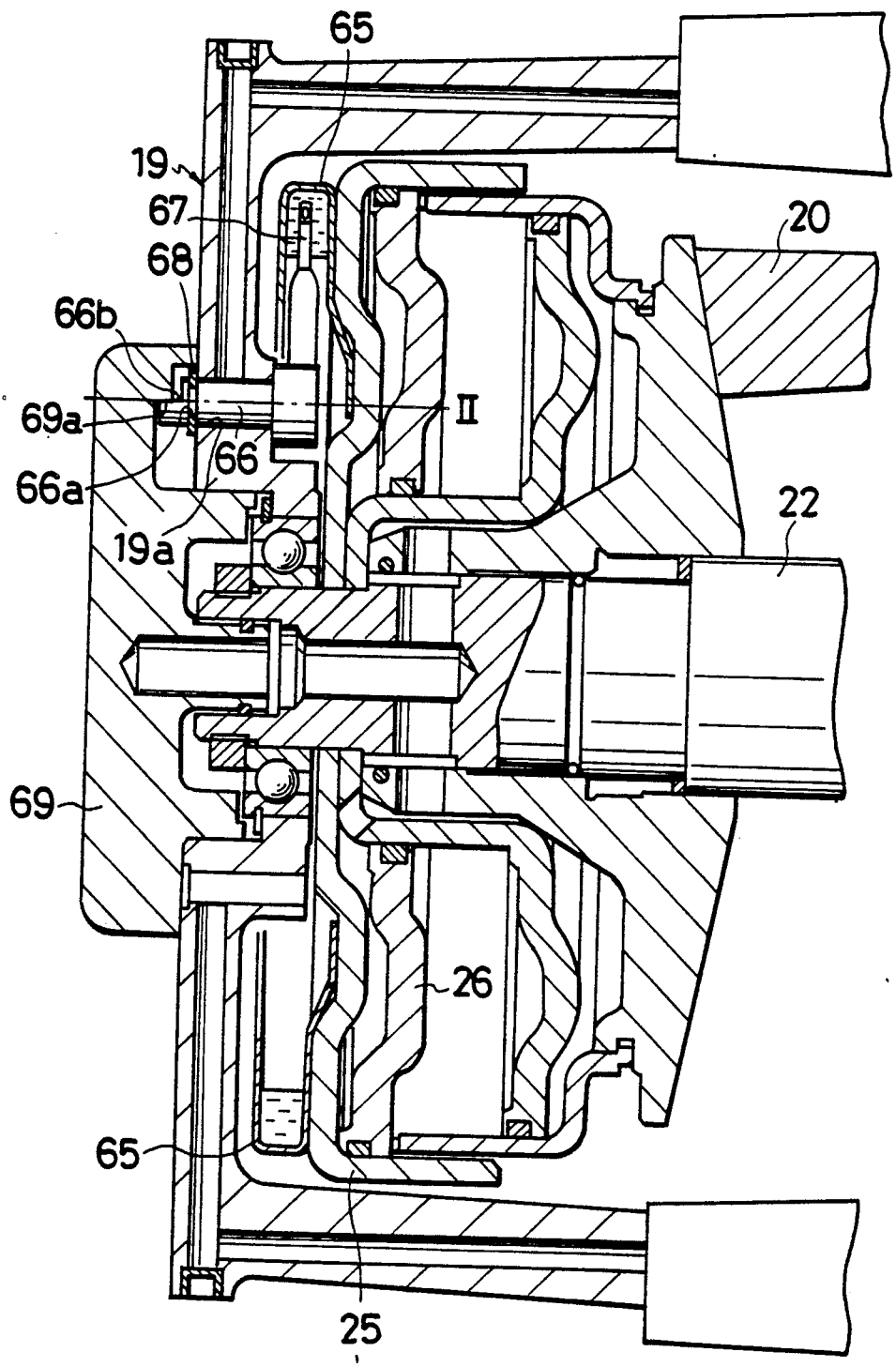
FIG. 9 is a sectional view of another structure of the belt-pulley mechanism.

Referring to FIG. 9, there is shown another embodiment of a structure of the belt-pulley mechanism D. Similar members are indicated by the same numerals and detailed explanation thereof will be omitted.

In this structure, a hydraulic fluid receiving member 65 is mounted on a back side of the cylinder 25 to define a fluid receiving section of a U-shaped configuration in section toward an axis of the primary shaft 22. A pitot pressure taking member 66 is mounted on a case 19 for taking the pitot pressure in the fluid receiving section out and for introducing it into the second pilot pressure introducing port 44e of the switch valve 44. The case 19 is formed with a hole 19a for receiving the pitot pressure taking member 66. A pitot tube 67 for detecting the pitot pressure is mounted on the pitot pressure taking member 66 to be dipped in the hydraulic fluid in the fluid receiving section. The member 66 is formed with an annular groove 66a with which a snap ring 68 is engaged after the member 66 is inserted into the hole 19a. The member 66 is further formed with a stepped portion 66b which is brought into engagement with a stepped portion 69a of a case cap 69 covering an end portion of the primary shaft 22. The stepped portions 66b and 69a have configurations complementary to each other. Thus, the member 66 can be always positioned easily and properly when mounted because the rotation of the member 66 is restricted by virtue of the engagement of the stepped portions 66b and 69a, and axial movement is prevented by the snap ring 68.

Figure 10:
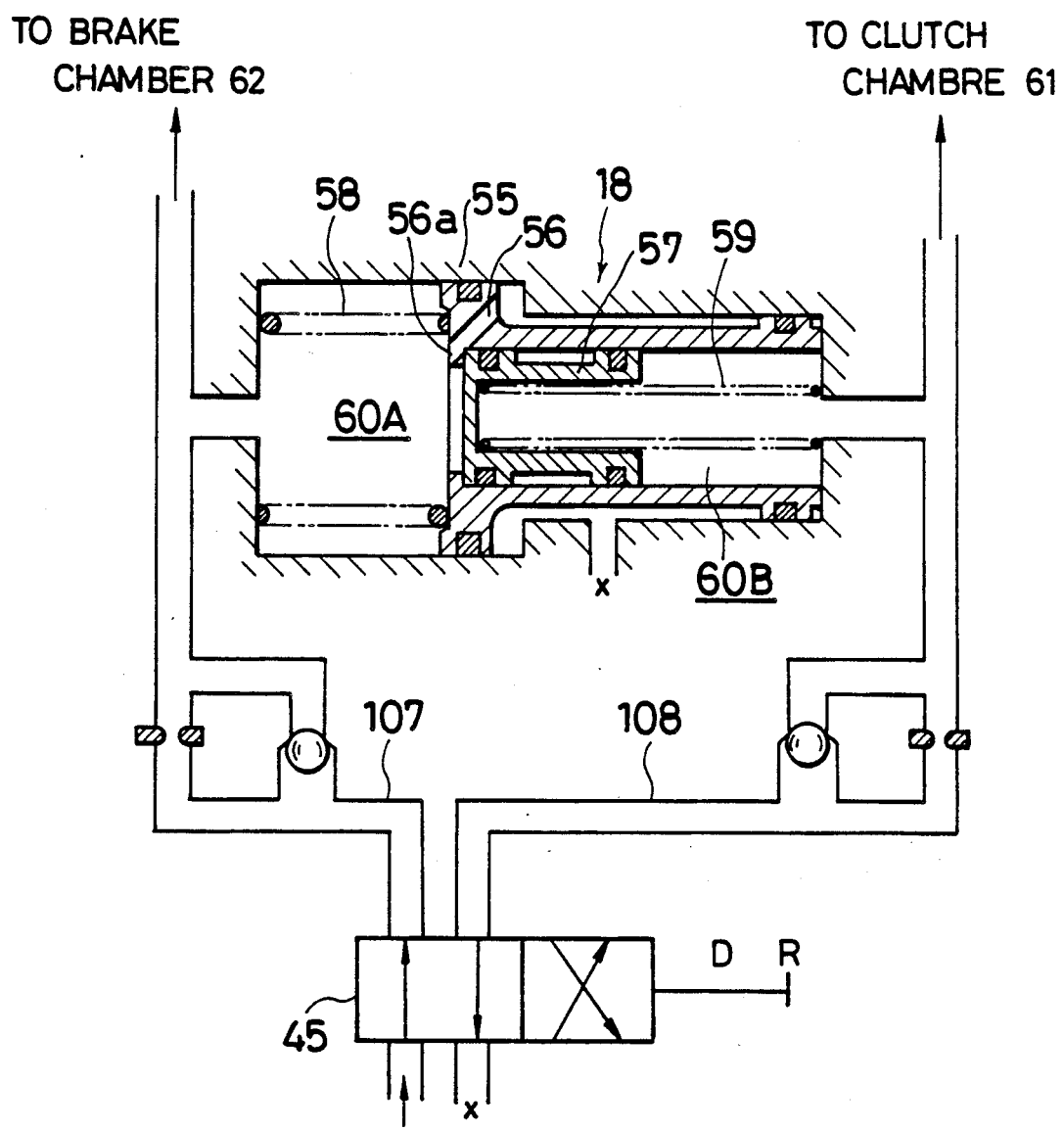
FIG. 10 is a sectional view of an accumulator employed in the present invention.

FIG. 10 shows a detailed structure of the accumulator 18. The accumulator 18 is provided with a cylinder 55, a first piston 56 and a second piston 57 disposed in the cylinder 55, a first spring 58 for urging the first piston 56, and a second spring 59 for urging the second piston 57. The first piston 56 is greater than the second piston 57 in pressure area on which the hydraulic pressure acts. The first spring 58 has a greater spring constant than the second spring 59. The second piston 57 is brought into engagement with a projection 56a formed on the first piston 56 whereby movement of the second piston 57 is restricted.

In operation, when a hydraulic pressure is introduced into a second hydraulic chamber 60B which is also introduced into the clutch chamber 61, the first and second piston 56 and 57 move together toward a first hydraulic chamber 60A to define a clutch pressure for providing a clutch operation. When a hydraulic pressure is introduced into the brake chamber 62, a hydraulic pressure introduced into the first hydraulic pressure 60A causes the second piston 57 to move toward the second hydraulic chamber 60B against a resilient force of the second spring 59 to define a brake pressure for effecting a braking operation. Thus, operation of this accumulator 18 is effected for both the clutch 16 and the brake 17.

Hereinafter, there is described another embodiment of the hydraulic control system for the speed ratio.

Figure 11:
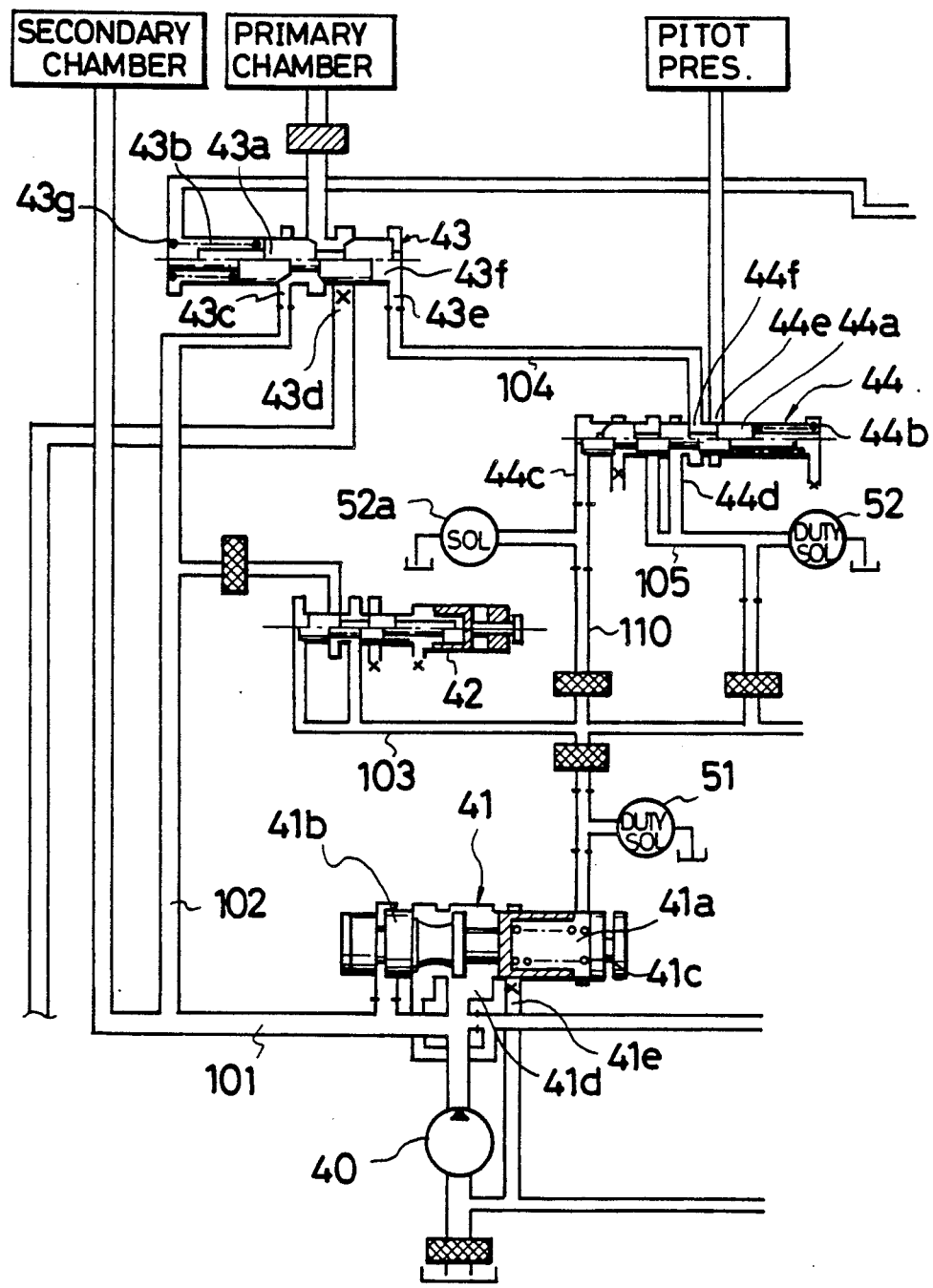
FIG. 11 is a view showing a hydraulic circuit employed in the present invention in accordance with another embodiment.

In this embodiment, there is provided a fourth solenoid valve 52a for controlling the pilot pressure introduced into the switch valve 44 as shown in FIG. 11. The valve 52a is provided on a line 110 which communicates the line 103 and the pilot port 44c of the switch valve 44. Thus, the solenoid valve 52a is employed for controlling only the pilot pressure for the switch valve 44 so that more accurate control for the switch valve 44 is provided.

Figure 13:
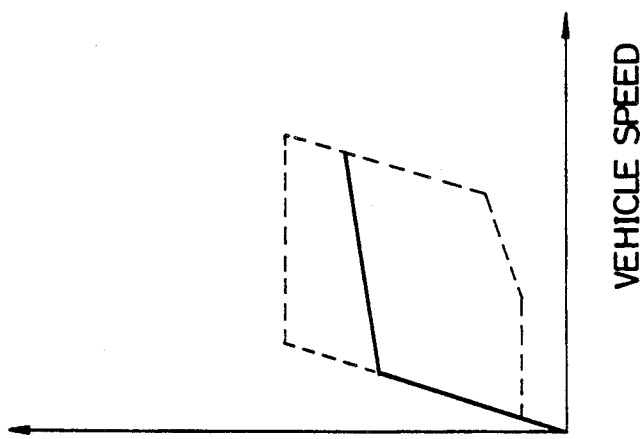
FIG. 13 is a graphical representation similar to FIG. 7 but pertaining to the embodiment of FIG. 12.
Figure 12:
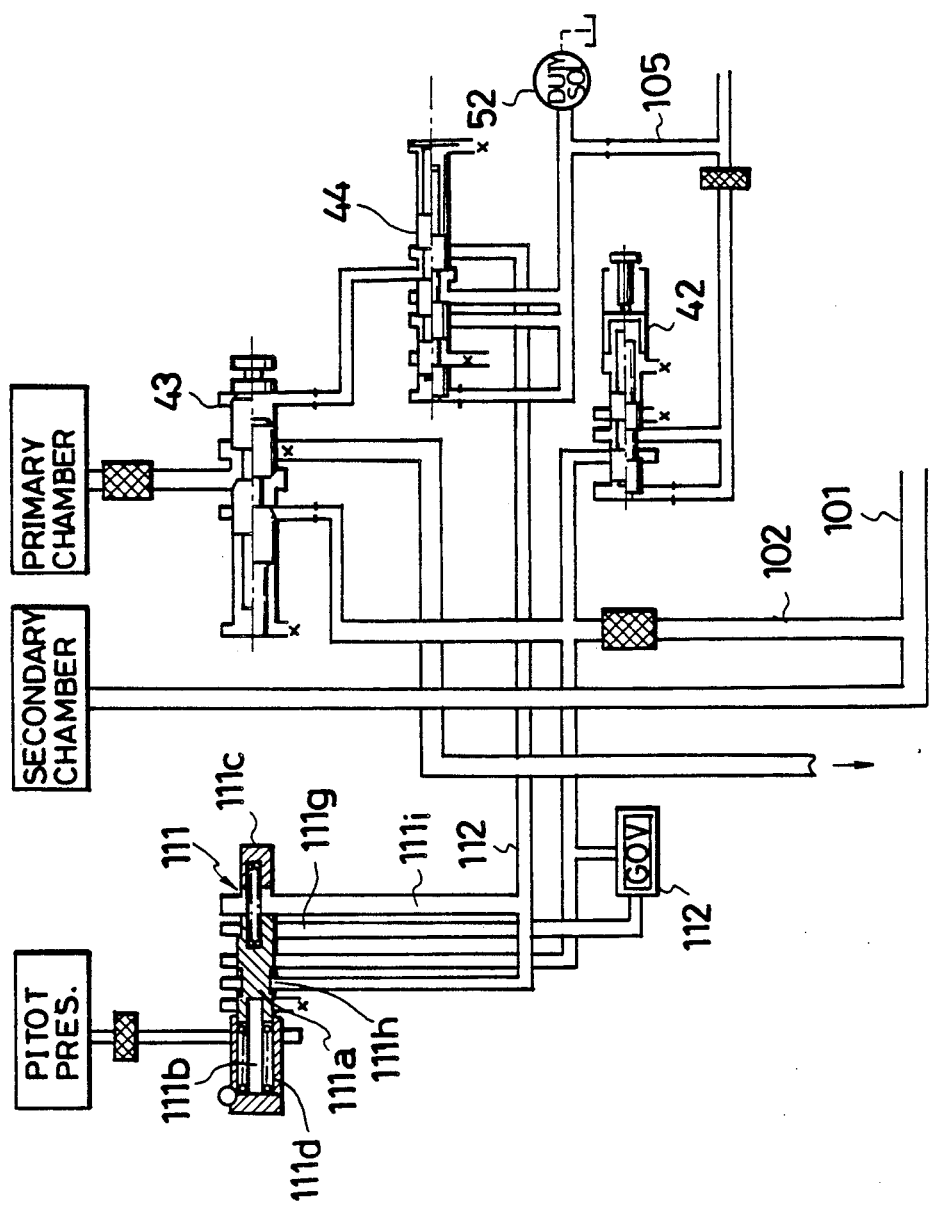
FIG. 12 is a view similar to FIG. 11 but showing still another embodiment of the invention.

Referring to FIG. 12, there is shown still further embodiment of the present invention. In this embodiment, there is provided another switch valve 111 for selectively providing the switch valve 44 with either the pitot pressure proportional to the engine speed or a governor pressure proportional to the vehicle speed. The switch valve 111 is provided with a spool 111a disposed in a body thereof to define hydraulic chambers 111b and 111c at opposite sides thereof. The switch valve 111 is further provided with a spring 111d in the chamber 111b and a spring 111e in the chamber 111c urging the spool in opposite directions from each other. The switch valve 111 is formed with a pitot pressure introducing port 111f, a governor pressure introducing port 111g from a governor 112, a control pressure supply port 111h and a feedback port 111i. A movement of the spool 111a selects one of hydraulic pressures from the governor pressure and the pitot pressure to provide the switch valve 44. According to the embodiment, a control property for the primary pulley 21 can be changed in accordance with the vehicle speed as well as the engine speed, for example, as shown in FIG. 13.

Figure 14:
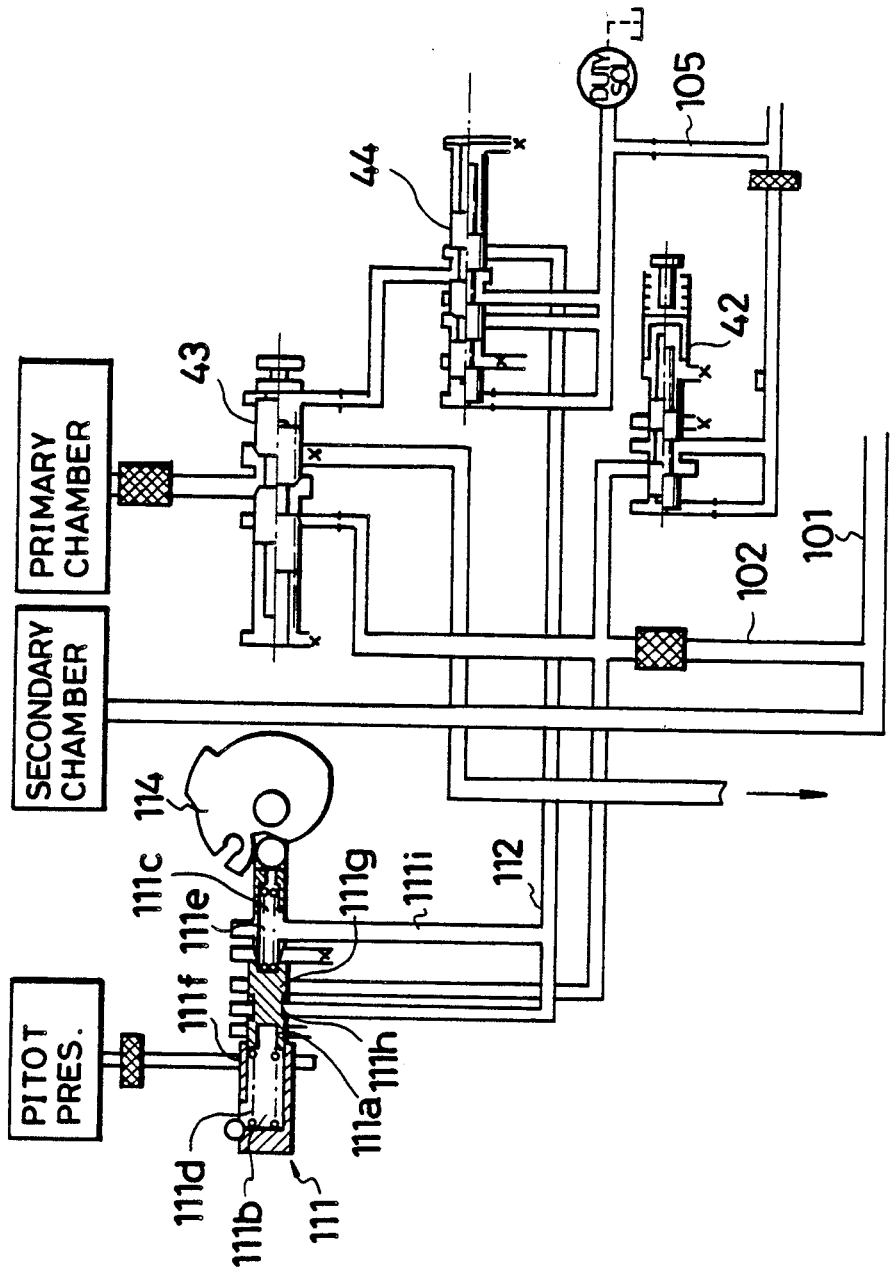
FIG. 14 is a view similar to FIG. 11 but showing a further embodiment of the present invention.

Referring to FIG. 14, a further inventive embodiment is shown. In this embodiment, the line pressure is introduced into the switch valve 111 instead of the governor pressure of the last mentioned embodiment through a line 113 separated from the 102. The spool 111a is moved by a throttle cam 114 which is engaged with the spool while rotating in accordance with the throttle valve opening or an engine load. This movement of the spool 111a changes a communication of the port 111g and the control pressure supply port 111i so that the hydraulic pressure introduced into the speed ratio control valve 43 through the switch valve 44 is changed when the switch valve 44 is actuated to utilize a pressure from the fluid pressure producing device. This means that the pilot pressure of the speed ratio control valve 43 can be controlled in accordance with the throttle opening or an acceleration stroke.

It will be apparent that various modifications and improvements may be made based on the above descriptions by those skilled in the art without departing from the scope of the claims as attached.

We claim:

1. A hydraulic control system for a steplessly variable power transmission comprising:
    primary and secondary pulleys, each provided with a stationary conical plate mounted on a shaft and a movable conical plate mounted so as to be axially movable on the shaft,
    a belt connected with both of the primary and secondary pulleys for transmitting engine power from said primary pulley to said secondary pulley,
    said primary and secondary pulleys each including a hydraulic chamber into which a hydraulic pressure is introduced for controlling axial movement of the movable conical plates so that effective diameters of the primary and secondary pulleys are changed for controlling a speed ratio transmitted through the transmission,
    a speed ratio control valve for controlling the hydraulic pressure introduced into the hydraulic chamber in accordance with a pilot pressure introduced into a pilot chamber provided in the speed ratio control valve,
    a solenoid valve for controlling the pilot pressure for the speed ratio control valve,
    fluid pressure producing means for producing a control pressure in accordance with a vehicle driving condition,
    switching means for selectively connecting the pilot chamber with either the solenoid valve or the fluid pressure producing means, the switching means being actuated to connect the pilot chamber with the fluid pressure producing means when a deviation between an actual pilot pressure and a desirable pilot pressure is increased beyond a predetermined value.

2. A hydraulic control system in accordance with claim 1 wherein the switching means is constituted by a switch valve for selectively connecting the pilot chamber of the speed ratio control valve with either the solenoid valve or the fluid pressure producing means.

3. A hydraulic control system in accordance with claim 2 wherein the switch valve is adapted to connect the pilot chamber with the fluid pressure producing means when the solenoid valve is out of order.

4. A hydraulic control system in accordance with claim 3 wherein the switch valve connects the pilot chamber with the fluid pressure producing means when the solenoid valve is burned out.

5. A hydraulic control system in accordance with claim 2 wherein the switch valve connects the pilot chamber with the fluid pressure producing means when a sensor for detecting the vehicle driving condition is out of order, a signal from the sensor being employed for controlling the solenoid valve.

6. A hydraulic control system in accordance with claim 2 wherein the switch valve connects the pilot chamber with the fluid pressure producing means when a viscosity of the fluid is higher than a predetermined value.

7. A hydraulic control system in accordance with claim 5 wherein the switch valve connects the pilot chamber with the fluid pressure producing means when the solenoid valve is turned off.

8. A hydraulic control system in accordance with claim 6 wherein the solenoid valve is a duty solenoid valve.

9. A hydraulic control system in accordance with claim 6 wherein a control for the speed ratio control valve utilizing the solenoid valve resumes when the viscosity of the fluid is lower than the predetermined value.

10. A hydraulic control system in accordance with claim 9 wherein a control gain for the solenoid valve is controlled so as to close to a target value of a speed ratio gradually when the control for the speed ratio control valve utilizing the solenoid valve resumes.

11. A hydraulic control system in accordance with claim 10 wherein the control gain is changed based on a difference between the target value and an actual value of the speed ratio.

12. A hydraulic control system in accordance with claim 11 wherein the control gain is controlled so as to have a predetermined change rate when the difference is smaller than a predetermined value, and wherein a change in the control gain is restricted when the difference is larger than the predetermined value.

13. A hydraulic control system in accordance with claim 12 wherein the solenoid valve is a duty solenoid valve.

14. A hydraulic control system in accordance with claim 1 wherein the switching mean is provided with a switch valve for selectively connecting the pilot chamber of the speed ratio control valve with either the solenoid valve or the fluid pressure producing means and switching solenoid means, and a switching solenoid for switching an introduction of the pilot pressure for the speed ratio control valve between the solenoid valve and the fluid pressure producing means in a predetermined driving condition of a vehicle.

15. A hydraulic control system in accordance with claim 1 wherein the fluid pressure producing means produces a hydraulic pressure in accordance with an engine speed.

16. A hydraulic control system in accordance with claim 15 wherein the fluid pressure producing means produces a hydraulic pressure in accordance with the engine speed and one of an engine load, a vehicle speed, and both an engine load and a vehicle speed.

17. A hydraulic control system in accordance with claim 15 wherein the hydraulic pressure is a pitot pressure.

18. A hydraulic control system in accordance with claim 1 wherein the switching means connects the speed ratio control valve with the fluid pressure producing means when the solenoid valve is out of order and when a viscosity of a hydraulic fluid employed for a speed ratio control is higher than a predetermined value.

19. A hydraulic control system in accordance with claim 2 wherein the switch valve connects the pilot chamber with the fluid pressure producing means when the solenoid valve is burned out.

20. A hydraulic control system in accordance with claim 1 wherein a speed ratio control utilizing the solenoid valve resumes when the actual pilot pressure returns to a normal condition.

21. A hydraulic control system in accordance with claim 20 wherein a control gain for the solenoid valve is controlled so as to close to a target value of a speed ratio gradually when the control for the speed ratio control valve utilizing the solenoid valve resumes.

22. A hydraulic control system in accordance with claim 21 wherein the control gain is changed based on a difference between the target value and an actual value of the speed ratio.

23. A hydraulic control system in accordance with claim 2 wherein a speed ratio control utilizing said solenoid valve resumes when the pilot pressure recovers to a normal condition.

24. A hydraulic control system in accordance with claim 23 wherein a control gain for the solenoid valve is controlled so as to close to a target value of a speed ratio gradually when the control for the speed control valve resumes.

25. A hydraulic control system in accordance with claim 24 wherein the control gain is changed based on a difference between the target value and an actual value of the speed ratio.

26. A hydraulic control system in accordance with claim 25 wherein the control gain is controlled so as to have a predetermined change rate when the difference is smaller than a predetermined value, and a change in the control gain is restricted when the difference is larger than the predetermined value.

* * * * *